Figure 1:
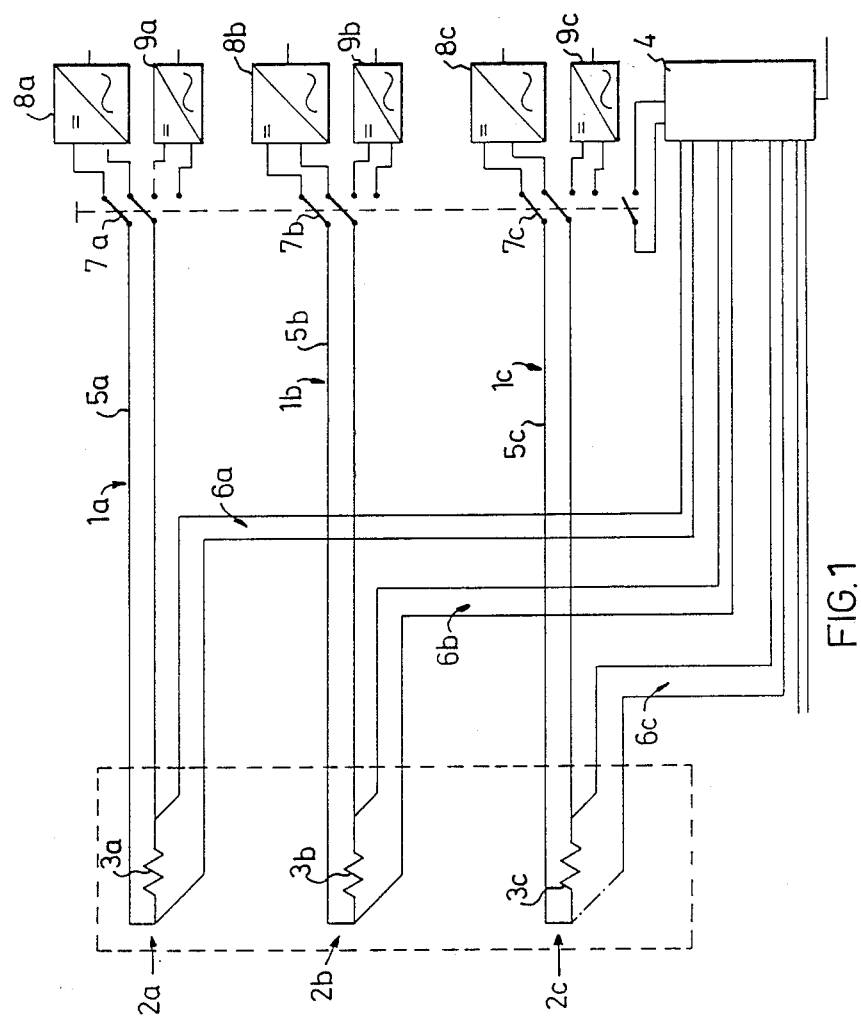

United States Patent [19]

Becker

[11] Patent Number: 4,965,041

[45] Date of Patent: Oct. 23, 1990

[54] INSTRUMENT FOR MONITORING THE COOLING CONDITIONS IN A LIGHT WATER REACTOR

[76] Inventor: Kurt Becker, Illerstigen 16, S-171 71, Solna, Sweden

[21] Appl. No.: 132,071

[22] Filed: Dec. 11, 1987

[51] Int. Cl.$^5$ .............................................. G21C 17/02
[52] U.S. Cl. ................................. 376/258; 376/247; 73/292; 374/142
[58] Field of Search ................ 376/247, 258; 374/142; 73/292, 295; 340/622

[56] References Cited

U.S. PATENT DOCUMENTS

| | | | |
|---|---|---|---|
| 3,465,315 | 9/1969 | Alexander et al. | 374/142 |
| 3,537,085 | 10/1970 | Mayer et al. | 73/292 |
| 4,053,874 | 10/1977 | Glaser | 73/295 |
| 4,216,675 | 8/1980 | Nagata et al. | 73/362 |
| 4,376,245 | 3/1983 | Lindskog et al. | 338/238 |
| 4,449,403 | 5/1984 | McQueen | 376/247 |
| 4,521,373 | 6/1985 | Terhune et al. | 376/247 |
| 4,666,656 | 5/1987 | Bertrand | 376/247 |

FOREIGN PATENT DOCUMENTS

| | | |
|---|---|---|
| 3327047 | 2/1984 | Fed. Rep. of Germany . |
| 2518747 | 6/1983 | France . |
| 2143950 | 2/1985 | United Kingdom . |

*Primary Examiner*—Daniel D. Wasil
*Attorney, Agent, or Firm*—Armstrong, Nikaido, Marmelstein, Kubovcik & Murray

[57] ABSTRACT

The instrument for monitoring of the cooling conditions in the reactor core of a light water reactor includes a probe (2), which is introduced into the reactor vessel and comprises a casing (12) made from a low neutron absorbing and water-resistant material, a resistor (11) being hermetically enclosed in the casing (12). The resistor (11) is connected to power supply lines (5). The resistance of the resistor (11) is dependent on the temperature of the resistor. The instrument also includes sensing means providing an output signal, which is dependent on the resistance of the resistor (11), when current flows through the same.

In a first mode of operation the monitor is used for detection of a reduction or loss of cooling capacity of the coolant surrounding the probe (2). A relatively high power is then supplied to the resistor, and the supplied power is adjusted to match the cooling capacity in such a way, that the heat, which is developed in the resistor as a result of the supplied power, is carried off by the coolant surrounding the probe (2). However, if the cooling capacity by any reason, for example in case of a loss of coolant accident, is reduced, the temperature in the resistor (11) will rise. Since the resistance of the resistor (11) is strongly dependent on the temperature, the resistance is changed and as a consequence the output signal derived from the sensing means is changed.

7 Claims, 2 Drawing Sheets

INSTRUMENT FOR MONITORING THE COOLING CONDITIONS IN A LIGHT WATER REACTOR

The present invention concerns a method and an instrument for monitoring the cooling conditions in the reactor core in Light Water Reactors. In the method at least one probe provided with power supply means is introduced into the reactor vessel.

The need for reliable core cooling monitors became evident during the Three Mile Island accident, and it has been proposed that perhaps the destruction of the reactor core could have been avoided if the reactor had been equipped with monitors, which could have given direct information about the cooling conditions inside the reactor core. In several countries the Reactor Inspectorates have now prescribed that core cooling monitors should be installed in LWR's.

Such instruments must be able to indicate rapidly and clearly when the cooling of the reactor core is lost, which would occur if the liquid level in the reactor vessel falls below the level where the reactor core starts to uncover. Especially, it is of great importance that the response of the monitor is sufficiently large in order to avoid any misinterpretations, which could lead to undesirable operator actions. Such misinterpretations could for instance be caused by the rapid depressurization which follows a large break LOCA (Loss of Coolant Accident), when, for instance the pressure in a BWR decreases from 70 bar to 4–5 bar in a rather short time and the corresponding saturation temperature of the coolant decreases from 285° C. to about 150° C.

Different concepts for monitoring the cooling of the reactor core have been reported. Systems based on pressure drop measurements have been proposed by Westinghouse and by Babcock & Wilcox. The output signals obtained from this kind of instruments may be difficult to interprete during rapidly changing conditions, which may exist during an accident situation. Hence, computer programs must be used for the interpretation of the signals, preventing a direct and reliable observation of the coolant inventory in the reactor vessel.

Another method, which is used by Combustion Engineering, is based on a heated junction thermocouple probe. The probe contains a dual thermocouple, with one heated junction and one unheated junction. Thus, the output from the probe is directly related to the cooling capacity of the surrounding fluid. An output voltage from the thermoelement indicates that there exists a temperature difference between the heated and the unheated junction and that the cooling capacity of the surrounding coolant is insufficient to cool the heated junction. This would indicate that also the core is insufficiently cooled. This principle suffers from the disadvantage that the output signal is on the order of a few millivolts only. For that reason the output signal could easily be disturbed by other phenomena occurring in the reactor.

We would also like to mention a method proposed by General Electric Co. (DE 3327047 A1). In this method a small electrical heater is used as sensor. If the water level in the reactor should fall and the heater becomes uncovered, the temperature of the heater would increase because of the reduction of the heat transfer coefficient. The heater, however, consists only of a co-axial cable, where the inner lead serves as a heat generating resistor and the outer shroud is used to close the electrical circuit. It is evident that the power density of this sensor is small because of the small surface area of the inner lead. The heatup of the detector due to its becoming uncovered will therefore be small and the claimed increase of the ohmic resistance caused by its being uncovered may actually be smaller than the ohmic resistance decrease, which is caused by the decrease of the coolant saturation temperature occurring during a LOCA. The latter temperature decrease, which in BWR's may be up to ~130° C. and in PWR's up to ~170° C., will also reduce the ohmic resistance of the up to 15 meter long cables, which are needed in order to connect the co-axial sensors located in the reactor core with the electrical system outside of the reactor pressure vessel. Thus, during certain accident sequences, such monitors could give ambiguous signals and cause false interpretations with regard to the conditions in the reactor core.

It should be recognized that the increase of the temperatures in the core when inadequate cooling occurs cannot be followed with any of the instruments mentioned above.

The object of the present invention is to provide a method and an instrument for monitoring the cooling of a core in a light water reactor providing an output signal, which clearly and unambiguously indicates the occurrence of a disturbance of the cooling of the reactor core, and which has a strength such that possible occurring interferences are negligible, and which also can be used to measure the temperature in the reactor core during the heat up period after the loss of coolant. This object has been achieved by employing a high power density electrical heater, consisting of a tightly wound electrical heating coil, where the ohmic resistance of the wire varies strongly with the temperature. The resistance coil is mounted inside a metal housing and the space between the coil and the housing is filled with an electrically insulating material. Thus, the coil is electrically separated from the outer housing. The power to the coil is supplied by means of two leads, which are welded to the ends of the resistance wire. In order to measure only the ohmic resistance of the heater wire and to exclude the resistance of the long cables, which connect the monitor to the instrumentation outside of the pressure vessel, two additional leads are welded to the heater coil. The voltage over the monitor is measured by means of the latter two leads. All of the mentioned four leads are parts of a commercially available 4 lead sheathed cable.

If the monitor during a reactor accident should become uncovered, the heat transfer coefficient between the monitor and the coolant would decrease drastically, and because of the high power density the voltage across the monitor would increase rapidly. For a constant current in the range between 3 and 5 A the average response over the first 30 seconds of the transient would be between 20 and 60 mV/s. This signal will unambiguously indicate an uncovered monitor. When the uncovery of the reactor core has thus been verified and the heatup of the core begins, it is, indeed, desirable to measure the temperature in the reactor core. The current input to the monitor is then reduced to the mA range and the monitor now serves as a resistance thermometer.

According to the invention this object is solved by a method for monitoring the cooling conditions in the reactor core of a light water reactor, in which a probe provided with power supply means is introduced into the reactor vessel, wherein the probe comprises at least one electric heating element containing a resistor, which is connected to said power supply means and whose resistance is dependent on the temperature of the resistor, and sensing means connected to the resistor and providing an output signal, which is dependent on the resistance of the resistor, when current flows through the resistor, the resistor being in heat transfer contact with a medium which surrounds the probe, and wherein, in a first mode of operation for the detection of a reduction of the cooling capacity around the probe, the resistor is supplied with a relatively high power, being such, that the heat, which is generated in the resistor by this, is carried off by the coolant surrounding the probe, when the core is normally cooled, said heat bringing about a temperature rise in the resistor in the case of a reduction or loss of the cooling capacity around the probe, resulting in a changed resistance and changed output signal. This invention also comprises an instrument for monitoring the cooling conditions in a reactor vessel of a light water reactor, comprising a probe insertable into the reactor vessel and provided with power supply means, wherein the probe comprises a casing made from a water resistant material, a resistor imperviously encapsuled in the casing and connected to the power supply means, the resistance of the resistor being dependent on the resistor temperature, a heat conducting medium arranged between the inner wall of the casing and the resistor, and sensing means providing an output signal, which is dependent on the resistance of the resistor, when current flows through the resistor.

The invention provides great advantages in comparison with prior art:

1. In a loss of coolant accident the response of the monitor would be up to 200 times or more larger compared with the signals attainable from monitors which are based on the heated thermocouple junction method. Because of the large response the risk for misinterpretations of the signals can be regarded as negligible.
2. The instrument can be used, especially after a detected loss of coolant accident, for measuring of the temperature inside the reactor core as well as outside the reactor core.
3. The instrument takes very little space and is constructed from very few parts, which are reliable in operation, thus reducing the error possibility. Especially the probe can be designed to be contained within the instrumentation guide tubes already existing in the reactor.
4. If a probe is arranged within the reactor core the instrument may serve as a core cooling monitor, a liquid level indicator or as a thermometer, If, however, the probe is placed above, below or beside the reactor core the instrument functions as a liquid level indicator or as a thermometer.
5. During the heat up phase which occurs after a loss of coolant, the output signal from the monitor may be used to activate certain safety equipment.
6. The probe does not need any shielding, since the output signal is so strong, that the influences from water droplets hitting the probe are negligible. Heated junction thermocouple probes are often shielded against such disturbances, especially against the splashing, which occurs just above the surface of a two phase steam water mixture.

Laboratory tests in which a steam water loop operating in a pressure range between 1-160 bar was used, have shown that the anticipated effects of splashing liquid and droplet deposition had negligible influence on the response from the monitor, when the normal coolant level disappeared and the probes became uncovered.

Figure 2:
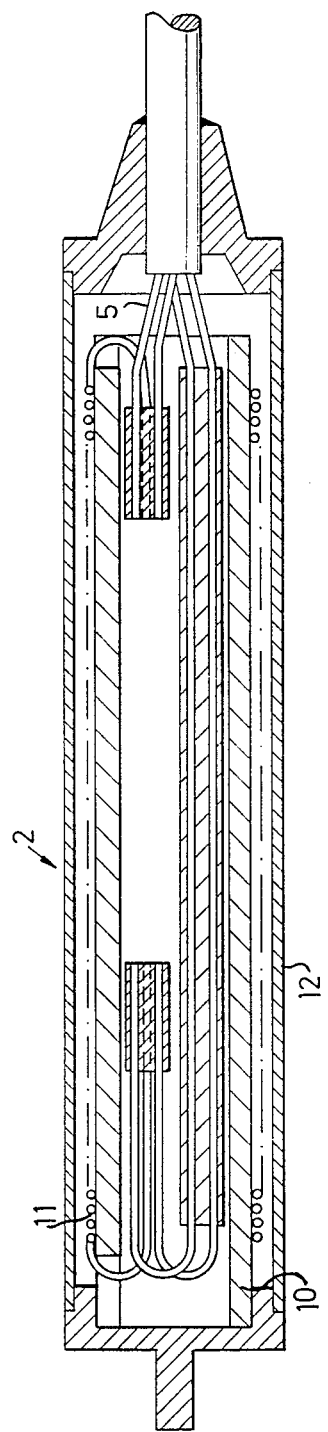

Other advantages and features of the invention will become more evident from the following description of an embodiment of the invention by reference to the accompanying drawings, in which FIG. 1 shows a circuit diagram comprising three measuring instruments in accordance with the invention and FIG. 2 in section shows a probe, which is a part of one of the measuring instruments shown in the diagram in FIG. 1.

In the circuit diagram of FIG. 1 three measuring instruments $1a$, $1b$, $1c$, are provided, each comprising a probe $2a$, $2b$ and $2c$, respectively, which is introduced into the reactor vessel in a suitable place. Each probe $2a$, $2b$, $2c$ includes a resistor $3a$, $3b$ and $3c$, respectively, whose resistance is dependent on the temperature of the resistor. Each resistor is by means of signal lines $6a$, $6b$ and $6c$, respectively, connected to a recorder 4, which in this case records the voltage across each resistor. The resistors $3a$, $3b$, $3c$ are connected to power supply lines $5a$, $5b$, $5c$, which by means of switches $7a$, $7b$, $7c$ are connectable to either of two power sources $8a$, $8b$, $8c$ and $9a$, $9b$, $9c$, respectively.

In a first mode of operation, the resistors $3a$, $3b$, $3c$ are connected to a first power source $8a$, $8b$ and $8c$, respectively, supplying relatively high power to the corresponding resistor, for example 4 A. At normal operation, the heat, which is generated by the supplied power in the resistors $3a$, $3b$, $3c$, will be carried off by the surrounding coolant in the reactor, with a very slight temperature rise in the resistors as a result. However, if a reduction of the cooling capacity of the surrounding medium occurs, for instance by loss of coolant, the corresponding resistor $3a$, $3b$, $3c$ will be insufficiently cooled, which will increase the temperature in the corresponding resistor. The temperature rise in the resistor, changes the resistance of the resistor. If the monitor is supplied with a constant current, the voltage output would increase rapidly in case the cooling of the reactor core is lost. At a predetermined output signal level, which can be in the order of some volts, an alarm is released indicating the loss of core cooling in the reactor, whereupon necessary safety steps are released or undertaken.

The switches $7a$, $7b$, $7c$ may then be switched over, thereby connecting the resistors $3a$, $3b$, $3c$ to the second power sources $9a$, $9b$ and $9c$, respectively. This second power source supplies a considerably lower current, for example in the order of 0,1 A, to the corresponding resistor. In this second mode of operation with a very low power supply to the resistors $3a$, $3b$, $3c$ the instrument will function as a resistance thermometer. Thus, in this second mode of operation the instrument is used for monitoring the development of the temperature in the reactor core.

FIG. 2 shows the probe 2 of the instrument in section. A resistance wire 11, made from a suitable material, for instance Kanthal, is wound around an insulator 10, consisting of a solid body made from $Al_2O_3$ or another body covered with an electrically nonconducting material. The resistance wire 11 is connected to a power source by means of the cables 5. The resistor coil 11 is hermetically encapsuled, by means of laser or electron welding, within the casing 12 which is made from a low neutron absorbing and water-resistant material, for instance stainless steel or Inconel. The space between the resistor 11 and the casing 12 is filled with a heat conducting, electrically insulating and low neutron absorbing material, for example MgO-powder.

I claim:

1. Instrument for detecting loss of coolant in the reactor vessel of a light water reactor, comprising a probe (2) insertable into the reactor vessel and adapted under normal operating conditions be immersed in said coolant, wherein the probe (2) comprises a casing (12) made of water resistant material, a wire coil resistor concentric to said probe (3) hermetically encapsulated in said casing (12) and connected to a power supply means (5), the resistance of the resistor (3) being dependent on the resistor temperature, a heat transfer medium arranged between the inner wall of the casing (12) and the resistor (3), power supply means attached directly to said resistor via a pair of wires, sensing means separately attached directly to said resistor via a separate pair of wires providing an output signal, which is dependent on the resistance of the resistor (3) when current flows through the resistor, and further including means to supply sufficiently high power to said resistor to heat such to an extent that such heat is dissipated by said coolant under normal operating conditions, whereby the temperature of said resistor is substantially constant, and such that when said resistor is not covered by said coolant, its temperature rapidly increases and such increase is measurable by said sensing means whereby identifying a loss of coolant, and switching means (7) by means of which the resistor (3) is connected to at least one power source capable of providing at least two different power levels.

2. Instrument in accordance with claim 1, characterized in that the heat transfer medium is MgO-powder.

3. Instrument in accordance with claim 2, characterized in that the resistor (3) is made from Kanthal wire (11).

4. Instrument as claimed in claim 1 wherein said probe comprises a high power density electrical heater comprising a tightly wound electrical heating coil having an ohmic resistance which varies greatly as a function of temperature.

5. Instrument as claimed in claim 4 including means to measure the heat transfer coefficient between the probe and the coolant.

6. Instrument as claimed in claim 5 wherein said heat transfer coefficient measurement means comprises means to supply a substantially constant current and means to measure the voltage across said probe.

7. Instrument as claimed in claim 6 wherein said voltage measurement means comprises means to measure the rate of voltage change.

* * * * *